US012227352B2

(12) United States Patent
Faircloth

(10) Patent No.: US 12,227,352 B2
(45) Date of Patent: Feb. 18, 2025

(54) SINGLE-SERVE BEVERAGE POD WITH ADDITIVE ENCLOSURE AND METHODS OF MAKING AND USING THEREOF

(71) Applicant: JointJockey LLC, Cincinnati, OH (US)

(72) Inventor: Robert A. Faircloth, Lebanon, OH (US)

( * ) Notice: Subject to any disclaimer, the term of this patent is extended or adjusted under 35 U.S.C. 154(b) by 797 days.

(21) Appl. No.: 17/412,976

(22) Filed: Aug. 26, 2021

(65) Prior Publication Data

US 2022/0063898 A1    Mar. 3, 2022

Related U.S. Application Data

(60) Provisional application No. 63/073,036, filed on Sep. 1, 2020.

(51) Int. Cl.
*B65D 85/804* (2006.01)
*A47J 31/06* (2006.01)
*A47J 31/44* (2006.01)

(52) U.S. Cl.
CPC ...... *B65D 85/8046* (2013.01); *A47J 31/0673* (2013.01); *A47J 31/4403* (2013.01)

(58) Field of Classification Search
CPC .. A47J 31/0673; A47J 31/407; A47J 31/4403; B65D 85/8046; B65D 85/8061; B65D 85/8067
USPC ....................................................... 219/295
See application file for complete search history.

(56) References Cited

U.S. PATENT DOCUMENTS

| | | | |
|---|---|---|---|
| 5,840,189 A | 11/1998 | Sylvan et al. | |
| 8,361,527 B2* | 1/2013 | Winkler | A47J 31/3695 426/77 |
| 8,906,436 B2* | 12/2014 | Nowak | A23L 2/52 426/78 |
| 9,565,865 B2 | 2/2017 | Bhairam | |
| 10,336,531 B2* | 7/2019 | Trombetta | B65D 85/8046 |
| 10,406,186 B2 | 9/2019 | Finley et al. | |
| 2012/0097602 A1* | 4/2012 | Tedford | B65D 65/466 210/500.1 |
| 2013/0095212 A1* | 4/2013 | Beer | B65D 85/8061 426/433 |
| 2017/0020814 A1 | 1/2017 | Benson et al. | |

* cited by examiner

*Primary Examiner* — Chris Q Liu
*Assistant Examiner* — James F Sims, III
(74) *Attorney, Agent, or Firm* — Dinsmore & Shohl LLP

(57) ABSTRACT

The present disclosure is directed to a single-serve beverage pod having an additive enclosure and methods of making and using the same. The additive enclosure may serve to hold an additive that, when brewing a single-serve beverage, combines with a beverage precursor to yield a beverage infused with the additive. The present disclosure has recognized the difficulty in introducing a precise amount of desired additive in beverages, as well as the possibility of the additive being absorbed by or adversely affecting the beverage precursor, and provides a solution to making and using a single-serve beverage pod with a precise amount of desired additive.

18 Claims, 3 Drawing Sheets

SINGLE-SERVE BEVERAGE POD WITH ADDITIVE ENCLOSURE AND METHODS OF MAKING AND USING THEREOF

CROSS-REFERENCE TO RELATED APPLICATIONS

The present application claims priority to U.S. Provisional Application No. 63/073,036 filed Sep. 1, 2020, which is incorporated by reference herein in its entirety.

BACKGROUND

Field

The present disclosure relates to single-serve beverage pods and, more particularly, single-serve beverage pods with additive enclosures holding an additive and methods of preparing and using single-serve beverage pods with additive enclosures holding an additive.

Technical Background

The use of various flavorings and additions to single-serve beverage pods has been growing in popularity. For example, some single-serve beverage pods for coffee may include various flavorings such as cinnamon sugar or pumpkin spice. In fact there are hundreds of different flavored single-serve beverage pods just for coffee. Single-serve beverage pods also serve to make tea, cider, lemonade, various cocktails, hot chocolate, etc.

However, the use of single-serve beverage pods with various flavorings has been accomplished by combining both the beverage precursor and any additional flavorings together inside the single-serve beverage pod. By combining the beverage precursor and additional flavoring in the single-serve beverage pod prior to brewing, the beverage precursor may absorb the additional flavoring, the beverage precursor and additional flavoring may negatively interact, or the amount of additional flavoring that reaches the beverage is difficult to quantify.

Thus, a solution is needed for an improved apparatus and method of introducing an additive in a single-serve beverage pod without having to combine the beverage precursor and additive prior to brewing. In addition, such a solution should introduce a precise amount of desired additive in a beverage.

BRIEF SUMMARY

According to the subject matter of the present disclosure, a single-serve beverage pod may comprise an open container having an upper rim, a filter positioned within the open container holding beverage precursor, with a void remaining between the bottom of the filter and the bottom of the open container, and an additive enclosure disposed proximate the upper rim of the open container and separate from the beverage precursor.

In accordance with one embodiment of the present disclosure, a method of manufacturing a single-serve beverage pod may comprise positioning a filter within an open container, with a void remaining between the bottom of the filter and the bottom of the open container, placing beverage precursor in the filter, and covering the open container with an additive enclosure proximate the upper rim of the open container and separate from the beverage precursor.

In accordance with another embodiment of the present disclosure, a method of infusing a beverage with an additive may comprise positioning an open container with a filter holding beverage precursor within the open container and an additive enclosure holding an additive proximate the upper rim of the open container in the receiving receptacle of a single-serve beverage maker, puncturing the additive enclosure of the single-serve beverage pod, forcing the additive in the additive enclosure to drain into the single-serve beverage pod, directing water into the single-serve beverage pod proximate the beverage precursor and additive, allowing the water and beverage precursor to brew a beverage, and disposing the beverage and the additive from the single-serve beverage pod into a drinking vessel through a second puncture at the bottom of the open container.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
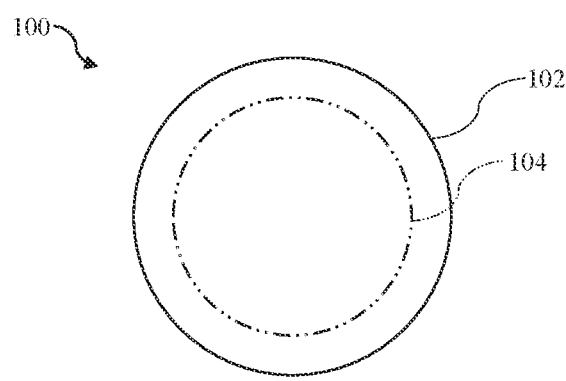
FIG. 1 is a schematic illustration of a side view of the additive enclosure according to one embodiment of the present application.

In one embodiment, the present invention relates to a single-serve beverage pod having an additive enclosure proximate an upper rim of a single-serve beverage pod container. In some embodiments, the single-serve beverage pod may be a K-Cup® container. K-Cup® containers are described in greater detail in U.S. Pat. No. 5,840,189, the contents of which are hereby incorporated by reference. In other embodiments, the single-serve beverage pod may be a Nespresso® pod or capsule or a Tassimo T-DISC™, or a single-serve beverage pod of another type.

As used herein, the additive enclosure may contain an additive such as, but not limited to, a dairy product, a bee-made product, a spice, a sweetener, an alcohol, a medicine, a cannabinoid oil, or any other flavoring oil.

The term "dairy product" refers to raw milk, raw milk derivative products, and any milk-alternative products. Examples of dairy products include, but are not limited to, pasteurized milk, condensed/evaporated milk, whole milk, low-fat milk, skimmed milk, powdered milk, powdered skimmed milk, cream, half and half, table cream, condensed cream, soy milk, almond milk, coconut milk, oat milk, rice milk, cashew milk, macadamia milk, walnut milk, hemp milk, quinoa milk, flax milk, peanut milk, and pea milk.

The term "bee-made product" refers to compounds made by bees or compounds synthesized to resemble compounds made by bees. Examples of bee-made products include, but are not limited to, honey, nectar, and beeswax.

The term "spice" refers to a seed, fruit, root, bark, or other plant substance primarily used for flavoring or coloring.

Examples of spices include, but are not limited to, allspice, anise, cardamom, cinnamon, cloves, coriander, ginger, mint, nutmeg, and turmeric.

The term "sweetener" refers to a substance used to sweeten. Examples of sweeteners include, but are not limited to, sucrose, syrup, acesulfame potassium, agave nectar, aspartame, high-fructose corn syrup, neotame, stevia leaf extract, saccharin, sucralose, and sugar alcohols.

The term "alcohol" refers to any substance that contains ethanol produced by the fermentation of grains, fruits, or other sources of sugar.

The term "medicine" refers to any medication used to diagnose, cure, treat, or prevent disease and includes both liquid and powder forms.

The term "cannabinoid" refers to a chemical compound that shows direct or indirect activity at a cannabinoid receptor. There are two main cannabinoid receptors, CNR1 (also known as CB1) and CNR2 (also known as CB2). Other receptors that research indicates have cannabinoid activity include the GPR55, GPR18, and TRPV1 receptors. Examples of cannabinoids include, but are not limited to, tetrahydrocannabinol (THC), cannabidiol (CBD), cannabinol (CBN), cannabigerol (CBG), cannabichromene (CBC), cannabicyclol (CBL), cannabivarin (CBV), tetrahydrocannabivarin (THCV), cannabidivarin (CBDV), cannabichromevarin (CBCV), cannabigerovarin (CBGV), and cannabigerol monomethyl ether (CBGM).

The term "cannabinoid oil" refers to a composition comprising one or more cannabinoids.

As used herein, the beverage precursor may include, but is not limited to, coffee grounds, tea leaves, or any other conventional or yet to be identified single-serve beverage precursor.

Figure 2:
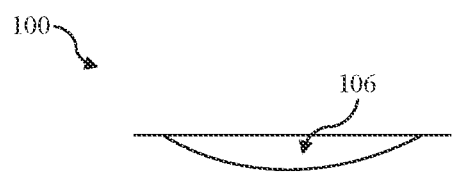
FIG. 2 is a schematic illustration of a top view of the additive enclosure according to one embodiment of the present application.

Reference is now made to FIGS. 1 and 2, which illustrate an embodiment of an additive enclosure 100. The additive enclosure may comprise an upper layer 102 and a lower layer 104 with an additive enclosure void 106 between the upper layer 102 and the lower layer 104. The additive enclosure void 106 between the upper layer 102 and the lower layer 104 may serve as a pocket to hold an additive. As depicted in FIG. 1, the additive enclosure 100 may be substantially circular, but other embodiments are envisioned where the additive enclosure 100 may be configured as a different shape.

Figure 3:
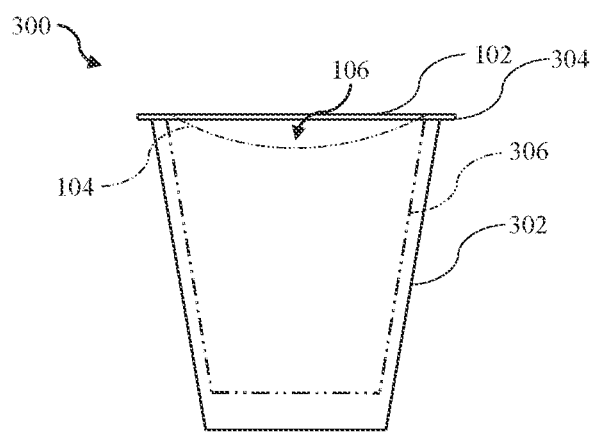
FIG. 3 is a schematic illustration of the additive enclosure proximate the upper rim of a single-serve beverage pod according to one embodiment of the present application.

Referring now to FIG. 3, an embodiment of a single-serve beverage pod 300 is disclosed. The single-serve beverage pod 300 may be an open container 302 having an upper rim 304. A filter 306 may be positioned within the open container 302 holding the beverage precursor. The filter 306 may be positioned such that a void remains between the bottoms of the filter and the bottom of the open container 302. As depicted in FIG. 3, the filter 306 may be a similar shape as the open container 302, with a smaller height dimension so that a void remains between the filter 306 and the open container 302. Alternatively, the filter 306 may be an alternative shape, such as conical, so that a void remains between the perimeter of the filter 306 and the open container 302. As can be seen in FIG. 3, the additive enclosure 100 depicted in FIGS. 1 and 2 may be disposed proximate the upper rim 304 of the open container 302. In other embodiments, it is foreseeable that the additive enclosure 100 may be positioned at the bottom of the single-serve beverage pod 300. The additive enclosure 100 may serve to seal the open container 302 or an additional film lid may be disposed over the additive enclosure 100 or over the upper rim 304 to seal the open container 302 of the single-serve beverage pod 300 and the additive enclosure 100.

Another embodiment relates to a method of manufacturing a single-serve beverage pod 300 having an additive enclosure 100 proximate the upper rim 304 of the open container 302 of the single-serve beverage pod 300.

The method of manufacturing a single-serve beverage pod 300 may comprise positioning a filter 306 within an open container 302, with a void remaining between the bottom of the filter 306 and the bottom of the open container 302, placing beverage precursor in the filter 306, and covering the open container 302 with an additive enclosure 100 proximate the upper rim 304 of the open container 302 and separate from the beverage precursor. The additive enclosure 100 may seal the open container 302 or an additional film lid may be disposed over the additive enclosure 100 to seal the open container 302 of the single-serve beverage pod 300 and additive enclosure 100.

Figure 4:
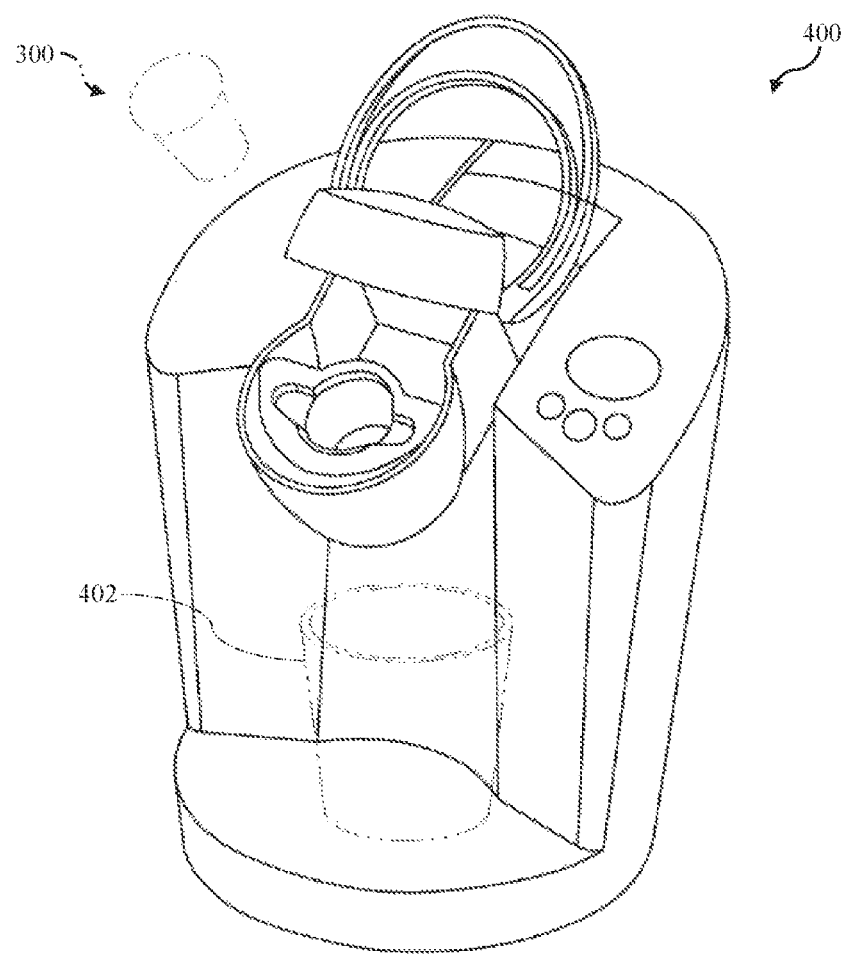
FIG. 4 is a schematic illustration of a single-serve beverage pod and a single-serve beverage maker according to one embodiment of the present application.

In another aspect, the present invention relates to a method of infusing a single-serve beverage with an additive. Referring now to FIG. 4, the method of infusing a single-serve beverage pod 300 with an additive may comprise positioning an open container 302 with a filter 306 holding beverage precursor within the open container 302 and an additive enclosure 100 holding an additive proximate the upper rim 304 of the open container 302 in the receiving receptacle of a single-serve beverage maker 400, puncturing the additive enclosure 100 of the single-serve beverage pod 300, forcing the additive in the additive enclosure 100 to drain into the single-serve beverage pod 300, directing water into the single-serve beverage pod 300 proximate the beverage precursor and additive, brewing a beverage from mixing the water, beverage precursor, and additive, and disposing the brewed beverage infused with the additive from the single-serve beverage pod 300 into a drinking vessel 402 through a second puncture at the bottom of the open container.

Various embodiments are covered by the aspects listed as follows. A first aspect is directed to a single-serve beverage pod comprising: an open container having an upper rim, a filter positioned within the open container holding beverage precursor, with a void remaining between the bottom of the filter and the bottom of the open container, and an additive enclosure disposed proximate the upper rim of the open container and separate from the beverage precursor.

In a second aspect, which encompasses the features of the first aspect, the beverage precursor comprises coffee grounds.

In a third aspect, which encompasses the features of the first and/or second aspects, the additive enclosure seals the open container.

In a fourth aspect, which encompasses the features of any of the first through third aspects, a film lid is disposed over the additive enclosure to seal the open container and additive enclosure.

In a fifth aspect, which encompasses the features of any of the first through fourth aspects, the additive enclosure holds an additive.

In a sixth aspect, which encompasses the features of the fifth aspect, the additive is selected from one of a dairy product, a bee-made product, a spice, a sweetener, an alcohol, a medicine, or a cannabinoid oil, or combinations thereof.

In a seventh aspect, which encompasses the features of the sixth aspect, the cannabinoid oil is selected from one of tetrahydrocannabinol (THC), cannabidiol (CBD), cannabinol (CBN), cannabigerol (CBG), cannabichromene (CBC), cannabicyclol (CBL), cannabivarin (CBV), tetrahydrocannabivarin (THCV), cannabidivarin (CBDV), cannabichromevarin (CBCV), cannabigerovarin (CBGV), and cannabigerol monomethyl ether (CBGM), or combinations thereof An eighth aspect is directed to a method of manufacturing a single-serve beverage pod, which may encompass the features of any the first through eighth aspects, the method comprising: positioning a filter within an open container, with a void remaining between the bottom of the filter and the bottom of the open container; placing beverage precursor in the filter; and covering the open container with an additive enclosure proximate the upper rim of the open container and separate from the beverage precursor.

In a ninth aspect, which encompasses the features of the eighth aspect, the beverage precursor comprises coffee grounds.

In a tenth aspect, which encompasses the features of the eighth and/or ninth aspects, the additive enclosure seals the open container.

In an eleventh aspect, which encompasses the features of any of the eighth through tenth aspects, a film lid is disposed over the additive enclosure to seal the open container and additive enclosure.

In a twelfth aspect, which encompasses the features of any of the eighth through eleventh aspects, the additive enclosure holds an additive.

In a thirteenth aspect, which encompasses the features of the twelfth aspect, the additive is selected from one of a dairy product, a bee-made product, a spice, a sweetener, an alcohol, a medicine, or a cannabinoid oil, or combinations thereof.

In a fourteenth aspect, which encompasses the features of the thirteenth aspect, the cannabinoid oil is selected from one of tetrahydrocannabinol (THC), cannabidiol (CBD), cannabinol (CBN), cannabigerol (CBG), cannabichromene (CBC), cannabicyclol (CBL), cannabivarin (CBV), tetrahydrocannabivarin (THCV), cannabidivarin (CBDV), cannabichromevarin (CBCV), cannabigerovarin (CBGV), and cannabigerol monomethyl ether (CBGM), or combinations thereof.

A fifteenth aspect is directed to a method of infusing a beverage with an additive comprising: positioning an open container with a filter holding a beverage precursor within the open container and an additive enclosure holding an additive proximate the upper rim of the open container in the receiving receptacle of a single-serve beverage maker; puncturing the additive enclosure of the single-serve beverage pod, forcing the additive in the additive enclosure to drain into the single-serve beverage pod; directing water into the single-serve beverage pod proximate the beverage precursor and additive, brewing a beverage from mixing the water, beverage precursor, and additive; and passing the brewed beverage infused with the additive from the single-serve beverage pod into a drinking vessel through a second puncture at the bottom of the open container.

In a sixteenth aspect, which encompasses the features of the fifteenth aspect, the beverage precursor comprises coffee grounds.

In a seventeenth aspect, which encompasses the features of the sixteenth aspect, the additive is selected from one of a dairy product, a bee-made product, a spice, a sweetener, an alcohol, a medicine, or a cannabinoid oil, or combinations thereof.

In a eighteenth aspect, which encompasses the features of the seventeenth aspect, the cannabinoid oil is selected from one of tetrahydrocannabinol (THC), cannabidiol (CBD), cannabinol (CBN), cannabigerol (CBG), cannabichromene (CBC), cannabicyclol (CBL), cannabivarin (CBV), tetrahydrocannabivarin (THCV), cannabidivarin (CBDV), cannabichromevarin (CBCV), cannabigerovarin (CBGV), and cannabigerol monomethyl ether (CBGM), or combinations thereof.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A single-serve beverage pod comprising:
   an open container having an upper rim;
   a filter positioned within the open container holding beverage precursor, with a void remaining between the bottom of the filter and the bottom of the open container; and
   an additive enclosure, wherein the additive enclosure comprises an upper layer and a lower layer, wherein the lower layer is non-porous, disposed proximate the upper rim of the open container and separate from the beverage precursor.

2. The single-serve beverage pod of claim 1, wherein the beverage precursor comprises coffee grounds.

3. The single-serve beverage pod of claim 1, wherein the additive enclosure seals the open container.

4. The single-serve beverage pod of claim 1, wherein a film lid is disposed over the additive enclosure to seal the open container and additive enclosure.

5. The single-serve beverage pod of claim 1, wherein the additive enclosure holds an additive.

6. The single-serve beverage pod of claim 5, wherein the additive is selected from one of a dairy product, a bee-made product, a spice, a sweetener, an alcohol, a medicine, or a cannabinoid oil, or combinations thereof.

7. The single-serve beverage pod of claim 6, wherein the cannabinoid oil is selected from one of tetrahydrocannabinol (THC), cannabidiol (CBD), cannabinol (CBN), cannabigerol (CBG), cannabichromene (CBC), cannabicyclol (CBL), cannabivarin (CBV), tetrahydrocannabivarin (THCV), cannabidivarin (CBDV), cannabichromevarin (CBCV), cannabigerovarin (CBGV), and cannabigerol monomethyl ether (CBGM), or combinations thereof.

8. A method of manufacturing a single-serve beverage pod, wherein the single-serve beverage pod comprises an open container having an upper rim, a filter positioned within the open container holding beverage precursor, with a void remaining between the bottom of the filter and the bottom of the open container, and an additive enclosure, wherein the additive enclosure comprises an upper layer and a lower layer, wherein the lower layer is non-porous, disposed proximate the upper rim of the open container and separate from the beverage precursor, the method of manufacturing comprising:

positioning a filter within an open container, with a void remaining between the bottom of the filter and the bottom of the open container;

placing beverage precursor in the filter; and covering the open container with an additive enclosure proximate the upper rim of the open container and separate from the beverage precursor.

9. The single-serve beverage pod of claim 8, wherein the beverage precursor comprises coffee grounds.

10. The method of claim 8, wherein the additive enclosure seals the open container.

11. The method of claim 8, wherein a film lid is disposed over the additive enclosure to seal the open container and additive enclosure.

12. The method of claim 8, wherein the additive enclosure holds an additive.

13. The method of claim 12, wherein the additive is selected from one of a dairy product, a bee-made product, a spice, a sweetener, an alcohol, a medicine, or a cannabinoid oil, or combinations thereof.

14. The method of claim 13, wherein the cannabinoid oil is selected from one of tetrahydrocannabinol (THC), cannabidiol (CBD), cannabinol (CBN), cannabigerol (CBG), cannabichromene (CBC), cannabicyclol (CBL), cannabivarin (CBV), tetrahydrocannabivarin (THCV), cannabidivarin (CBDV), cannabichromevarin (CBCV), cannabigerovarin (CBGV), and cannabigerol monomethyl ether (CBGM), or combinations thereof.

15. A method of infusing a beverage with an additive and a-single-serve beverage pod, wherein the single-serve beverage pod comprises an open container having an upper rim, a filter positioned within the open container holding beverage precursor, with a void remaining between the bottom of the filter and the bottom of the open container, and an additive enclosure, wherein the additive enclosure comprises an upper layer and a lower layer, wherein the lower layer is non-porous, disposed proximate the upper rim of the open container and separate from the beverage precursor, the method comprising:

positioning an open container with a filter holding a beverage precursor within the open container and an additive enclosure holding an additive proximate the upper rim of the open container in a receiving receptacle of the single-serve beverage pod;

puncturing the additive enclosure of the single-serve beverage pod, forcing the additive in the additive enclosure to drain into the single-serve beverage pod;

directing water into the single-serve beverage pod proximate the beverage precursor and additive, brewing a beverage from mixing the water, beverage precursor, and additive; and passing the brewed beverage infused with the additive from the single-serve beverage pod into a drinking vessel through a second puncture at the bottom of the open container.

16. The method of claim 15, wherein the beverage precursor comprises coffee grounds.

17. The method of claim 15, wherein the additive is selected from one of a dairy product, a bee-made product, a spice, a sweetener, an alcohol, a medicine, or a cannabinoid oil, or combinations thereof.

18. The method of claim 17, wherein the cannabinoid oil is selected from one of tetrahydrocannabinol (THC), cannabidiol (CBD), cannabinol (CBN), cannabigerol (CBG), cannabichromene (CBC), cannabicyclol (CBL), cannabivarin (CBV), tetrahydrocannabivarin (THCV), cannabidivarin (CBDV), cannabichromevarin (CBCV), cannabigerovarin (CBGV), and cannabigerol monomethyl ether (CBGM), or combinations thereof.

* * * * *